United States Patent
Lee et al.

(10) Patent No.: US 10,524,218 B2
(45) Date of Patent: Dec. 31, 2019

(54) METHOD FOR TRANSMITTING AND RECEIVING SYNCHRONIZATION SIGNAL IN WIRELESS COMMUNICATION SYSTEM

(71) Applicant: LG ELECTRONICS INC., Seoul (KR)

(72) Inventors: Kilbom Lee, Seoul (KR); Jiwon Kang, Seoul (KR); Kitae Kim, Seoul (KR); Kyungmin Park, Seoul (KR); Heejin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 108 days.

(21) Appl. No.: 15/567,007

(22) PCT Filed: Jan. 20, 2016

(86) PCT No.: PCT/KR2016/000592
§ 371 (c)(1),
(2) Date: Oct. 16, 2017

(87) PCT Pub. No.: WO2016/167447
PCT Pub. Date: Oct. 20, 2016

(65) Prior Publication Data
US 2018/0092053 A1    Mar. 29, 2018

Related U.S. Application Data

(60) Provisional application No. 62/148,765, filed on Apr. 17, 2015.

(51) Int. Cl.
*H04W 56/00* (2009.01)
*H04L 27/26* (2006.01)
(Continued)

(52) U.S. Cl.
CPC .......... *H04W 56/001* (2013.01); *H04L 27/26* (2013.01); *H04L 27/2613* (2013.01);
(Continued)

(58) Field of Classification Search
CPC ..... H04B 7/0617; H04B 7/0695; H04L 27/26; H04W 56/001
See application file for complete search history.

(56) References Cited

U.S. PATENT DOCUMENTS

2001/0049290 A1* 12/2001 Richter ................... H04L 7/041
455/502
2012/0243638 A1    9/2012 Maltsev et al.
(Continued)

*Primary Examiner* — Edan Orgad
*Assistant Examiner* — Nourali Mansoury
(74) *Attorney, Agent, or Firm* — Birch, Stewart, Kolasch & Birch, LLP (57) ABSTRACT

Disclosed are a method and a terminal for receiving a synchronization signal configured to: obtain information on a plurality of base station types in which a plurality of base stations are classified according to predetermined parameters; receive a synchronization signal from a base station of a cell where the terminal is positioned; estimate the number of repetitions of the synchronization signal and a band to which a sequence number of the synchronization signal belongs: select, using the estimation results, the base station type of a base station from which the synchronization signal was transmitted, from among the plurality of base station types; and perform a beam scanning process by considering the selected base station type.

12 Claims, 6 Drawing Sheets

(51) Int. Cl.
*H04W 88/02* (2009.01)
*H04B 7/06* (2006.01)

(52) U.S. Cl.
CPC ...... *H04L 27/2657* (2013.01); *H04L 27/2663* (2013.01); *H04L 27/2692* (2013.01); *H04B 7/0617* (2013.01); *H04B 7/0695* (2013.01); *H04W 88/02* (2013.01)

(56) References Cited

U.S. PATENT DOCUMENTS

| | | |
|---|---|---|
| 2013/0040688 A1 | 2/2013 | Mizusawa |
| 2013/0051373 A1 | 2/2013 | Ro et al. |
| 2014/0141779 A1 | 5/2014 | Yuk et al. |
| 2014/0148107 A1 | 5/2014 | Maltsev et al. |
| 2014/0321375 A1* | 10/2014 | Agiwal ............... H04W 56/001 370/329 |
| 2015/0094076 A1* | 4/2015 | Inoue .................. H04W 16/28 455/452.1 |
| 2016/0212631 A1* | 7/2016 | Shen .................. H04W 56/001 |
| 2016/0285578 A1* | 9/2016 | Webb ................. H04W 52/367 |
| 2016/0308637 A1* | 10/2016 | Frenne ................ H04J 11/0069 |

* cited by examiner

METHOD FOR TRANSMITTING AND RECEIVING SYNCHRONIZATION SIGNAL IN WIRELESS COMMUNICATION SYSTEM

CROSS REFERENCE TO RELATED APPLICATIONS

This application is the National Phase of PCT International Application No. PCT/KR2016/000592, filed on Jan. 20, 2016, which claims priority under 35 U.S.C. 119(e) to U.S. Provisional Application No. 62/148,765, filed on Apr. 17, 2015, all of which are hereby expressly incorporated by reference into the present application.

TECHNICAL FIELD

The present invention relates to a wireless communication system, and more particularly, to a method of transmitting and receiving a synchronization signal in a wireless LAN system and performing a beam scanning.

BACKGROUND ART

An ultrahigh frequency wireless communication system based on mmWave is configured to operate at a center frequency of several GHz to several tens of GHz. Doppler effect generated by movement of a UE or carrier frequency offset (CFO) generated by a difference in oscillators between a UE and a BS occurs more seriously due to the characteristic of the center frequency configured at an ultrahigh frequency. This is because that the Doppler effect is characterized in linearly increased with respect to the center frequency and CFO expressed by ppm ($10^{-6}$) is also characterized in linearly increased with respect to the center frequency.

In a cellular network of the related art, a transmitter transmits a reference symbol, and a receiver estimates and compensates for CFO by using the reference symbol. Therefore, in the ultrahigh frequency wireless communication system, another method of transmitting a synchronization signal for estimating/compensating for CFO generated more significantly than the related art should be suggested.

DISCLOSURE OF THE INVENTION

Technical Task

The present invention is directed to solve the above problems of the general technology, and one technical task of the present invention is to enable a user equipment to efficiently receive a synchronization signal in a communication system that uses an ultrahigh frequency band.

Another technical task of the present invention is to simply perform a beam scanning process with a base station using a received synchronization signal.

Further technical task of the present invention is to lower implementation complexity of a user equipment by categorizing a base station according to parameters of a synchronization signal and a beam scanning signal.

The technical problems solved by the present invention are not limited to the above technical problems and other technical problems which are not described herein will become apparent to those skilled in the art from the following description.

TECHNICAL SOLUTIONS

In one technical aspect of the present invention, provided herein is a method of receiving a synchronization signal by a user equipment in a wireless communication system, including obtaining information on a plurality of base station types resulting from sorting a plurality of base stations by a predetermined parameter, receiving the synchronization signal from a base station of a cell in which a user equipment located, estimating a repetition count of the synchronization signal and a band to which a sequence number of the synchronization signal belongs, selecting a type of the base station having transmitted the synchronization signal from the plurality of the base station types using a result of the estimation, and performing a beam scanning process in consideration of the selected type of the base station.

The predetermined parameter may include a cell property parameter, a synchronization signal parameter and a beam scanning signal synchronization signal.

The cell property parameter may include at least one of a transmit power of the base station, a cell radius and the number of subsectors.

The synchronization signal parameter may include at least one of a beam width of the synchronization signal, a repetitive transmission count of the synchronization signal, and a sequence band of the synchronization signal.

The beam scanning signal parameter may include at least one of a beam width of a beam scanning signal, a repetitive transmission count of the beam scanning signal and the number of OFDM (Orthogonal Frequency Division Multiplexing) symbols allocated to the beam scanning signal.

The performing the beam scanning process may be performed based on the beam scanning signal parameter corresponding to the selected type of the base station.

The estimating is performed based on an equation as follows: [Equation]

$$\{\hat{n}, \hat{M}, \hat{k}\} = \underset{\tilde{n},\tilde{M},\tilde{k}}{\operatorname{argmax}} \frac{\left|\sum_{i=0}^{\tilde{M}-1} y_{\tilde{n},i}^{H} s_{\tilde{k}}\right|}{\sum_{i=0}^{\tilde{M}-1} |y_{\tilde{n},i}^{H} s_{\tilde{k}}|},$$

where $\hat{n}$ indicates a reception timing of the synchronization signal, $\hat{M}$ indicates a repetition count of the synchronization signal, $\hat{k}$ indicates a band to which a sequence number of the synchronization signal belongs, $y_{\tilde{n},i}$ indicates the received synchronization signal, $s_{\tilde{k}}$ indicates a signal transmitted by the base station, and $\tilde{n},\tilde{M},\tilde{k}$ indicate trial values used for a process for calculating the equation.

In another technical aspect of the present invention, provided herein is a user equipment receiving a synchronization signal in a wireless communication system, including a transmitter, a receiver, and a processor operates by being connected to the transmitter and the receiver, wherein the processor obtains information on a plurality of base station types resulting from sorting a plurality of base stations by a predetermined parameter, controls the receiver to receive the synchronization signal from a base station of a cell in which a user equipment located, estimates a repetition count of the synchronization signal and a band to which a sequence number of the synchronization signal belongs, selects a type of the base station having transmitted the synchronization signal from the plurality of the base station types using a result of the estimation, and performs a beam scanning process in consideration of the selected type of the base station.

Advantageous Effects

According to embodiments of the present invention, the following effects are expected.

First of all, in a communication system of a ultrahigh frequency band, a process for a user equipment to receive a synchronization signal and perform a beam scanning with a base station can be improved.

Secondly, a user equipment can efficiently perform a beam scanning process by categorizing a type of a base station in advance despite not using a blind scheme, thereby lowering implementation complexity of the user equipment.

Thirdly, by implementing a plurality of parameters for a user equipment to grasp a type of a base station, accuracy of base station grasp can be raised.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The further technical features of the present invention are not limited to specific drawings and the features shown in the drawings are combined to construct a new embodiment. Reference numerals of the drawings mean structural elements.

BEST MODE FOR INVENTION

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof The words "a or an", "one", "the" and words related thereto may be used to include both a singular expression and a plural expression unless the context describing the present invention (particularly, the context of the following claims) clearly indicates otherwise.

In this document, the embodiments of the present invention have been described centering on a data transmission and reception relationship between a mobile station and a base station. The base station may mean a terminal node of a network which directly performs communication with a mobile station. In this document, a specific operation described as performed by the base station may be performed by an upper node of the base station.

Namely, it is apparent that, in a network comprised of a plurality of network nodes including a base station, various operations performed for communication with a mobile station may be performed by the base station, or network nodes other than the base station. The term base station may be replaced with the terms fixed station, Node B, eNode B (eNB), advanced base station (ABS), access point, etc.

The term mobile station (MS) may be replaced with user equipment (UE), subscriber station (SS), mobile subscriber station (MSS), mobile terminal, advanced mobile station (AMS), terminal, etc.

A transmitter refers to a fixed and/or mobile node for transmitting a data or voice service and a receiver refers to a fixed and/or mobile node for receiving a data or voice service. Accordingly, in uplink, a mobile station becomes a transmitter and a base station becomes a receiver. Similarly, in downlink transmission, a mobile station becomes a receiver and a base station becomes a transmitter.

Communication of a device with a "cell" may mean that the device transmit and receive a signal to and from a base station of the cell. That is, although a device substantially transmits and receives a signal to a specific base station, for convenience of description, an expression "transmission and reception of a signal to and from a cell formed by the specific base station" may be used. Similarly, the term "macro cell"

and/or "small cell" may mean not only specific coverage but also a "macro base station supporting the macro cell" and/or a "small cell base station supporting the small cell".

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

1. Communication System Using Ultrahigh Frequency Band

In an LTE (Long Term Evolution)/LTE-A (LTE Advanced) system, an error value of oscillators between a UE and an eNB is defined by requirements as follows.

UE side frequency error (in TS 36.101)

The UE modulated carrier frequency shall be accurate to within ±0.1 PPM observed over a period of one time slot (0.5 ms) compared to the carrier frequency received from the E-UTRA Node B eNB side frequency error (in TS 36.104)

Frequency error is the measure of the difference between the actual BS transmit frequency and the assigned frequency.

Meanwhile, oscillator accuracy according to types of BS is as listed in Table 1 below.

TABLE 1

| BS class | Accuracy |
| --- | --- |
| Wide Area BS | ±0.05 ppm |
| Local Area BS | ±0.1 ppm |
| Home BS | ±0.25 ppm |

Therefore, a maximum difference in oscillators between a BS and a UE is ±0.1 ppm, and when an error occurs in one direction, an offset value of maximum 0.2 ppm may occur. This offset value is converted to a unit of Hz suitable for each center frequency by being multiplied by the center frequency.

Meanwhile, in an OFDM system, a CFO value is varied depending on a subcarrier spacing. Generally, the OFDM system of which subcarrier spacing is sufficiently great is relatively less affected by even a great CFO value. Therefore, an actual CFO value (absolute value) needs to be expressed as a relative value that affects the OFDM system. This will be referred to as normalized CFO. The normalized CFO is expressed as a value obtained by dividing the CFO value by the subcarrier spacing. The following Table 2 illustrates CFO of an error value of each center frequency and oscillator and normalized CFO.

TABLE 2

| Center frequency (subcarrier spacing) | Oscillator Offset | | | |
| --- | --- | --- | --- | --- |
| | ±0.05 ppm | ±0.1 ppm | ±10 ppm | ±20 ppm |
| 2 GHz (15 kHz) | ±100 Hz (±0.0067) | ±200 Hz (±0.0133) | ±20 kHz (±1.3) | ±40 kHz (±2.7) |
| 30 GHz (104.25 kHz) | ±1.5 kHz (±0.014) | ±3 kHz (±0.029) | ±300 kHz (±2.9) | ±600 kHz (±5.8) |
| 60 GHz (104.25 kHz) | ±3 kHz (±0.029) | ±6 kHz (±0.058) | ±600 kHz (±5.8) | ±1.2 MHz (±11.5) |

In Table 2, it is assumed that a subcarrier spacing is 15 kHz when the center frequency is 2 GHz (for example, LTE Rel-8/9/10). When the center frequency is 30 GHz or 60 GHz, a subcarrier spacing of 104.25 kHz is used, whereby throughput degradation is avoided considering Doppler effect for each center frequency. The above Table 2 is a simple example, and it will be apparent that another subcarrier spacing may be used for the center frequency.

Meanwhile, Doppler spread occurs significantly in a state that a UE moves at high speed or moves at a high frequency band. Doppler spread causes spread in a frequency domain, whereby distortion of a received signal is generated in view of the receiver. Doppler spread may be expressed as $f_{doppler} = (v/\lambda)\cos\theta$. At this time, v is a moving speed of the UE, and $\lambda$ means a wavelength of a center frequency of a radio wave which is transmitted. $\theta$ means an angle between the radio wave and a moving direction of the UE. Hereinafter, description will be given on the assumption that $\theta$ is 0.

At this time, a coherence time is inverse proportion to Doppler spread. If the coherence time is defined as a time spacing of which correlation value of a channel response in a time domain is 50% or more, the coherence time is expressed as $$T_c \approx \frac{9}{16\pi f_{doppler}}.$$

In the wireless communication system, the following Equation 1 which indicates a geometric mean between an equation for Doppler spread and an equation for the coherence time is used mainly.

$$T_c = \sqrt{\frac{9}{16\pi f_{doppler}}} = \frac{0.423}{f_{doppler}} \qquad \text{[Equation 1]}$$

Figure 1:
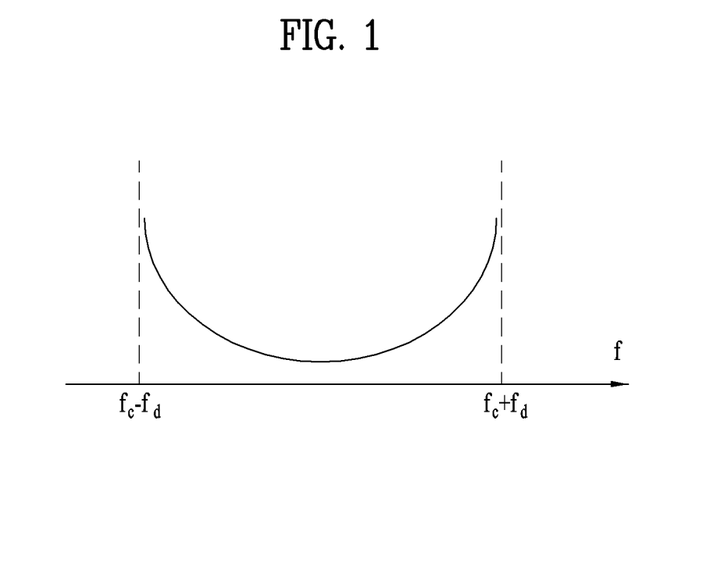
FIG. 1 is a diagram illustrating a Doppler spectrum.

FIG. 1 is a diagram illustrating a Doppler spectrum.

A Doppler spectrum or Doppler power spectrum density, which indicates a change of a Doppler value according to a frequency change, may have various shapes depending on a communication environment. Generally, in an environment, such as downtown area, where scattering occurs frequently, if received signals are received at the same power in all directions, the Doppler spectrum is indicated in the form of U-shape as shown in FIG. 1. FIG. 1 shows a U-shaped Doppler spectrum when the center frequency is $f_c$ and a maximum Doppler spread value is $f_d$.

Figure 2:
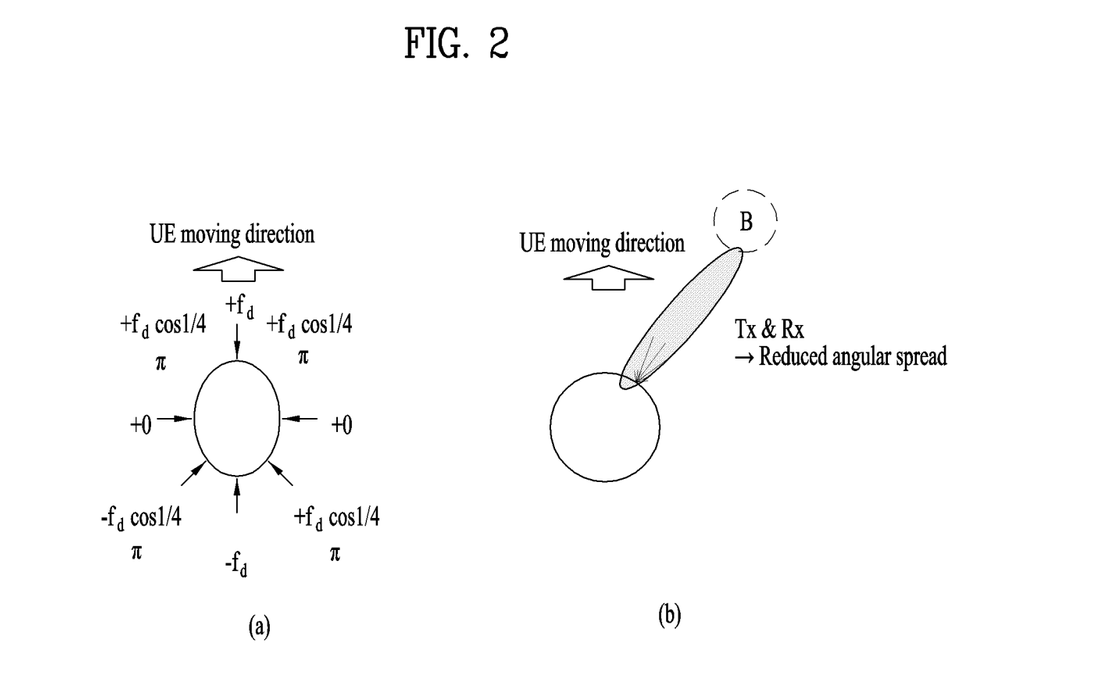
FIG. 2 is a diagram illustrating narrow beamforming related to the present invention.
Figure 3:
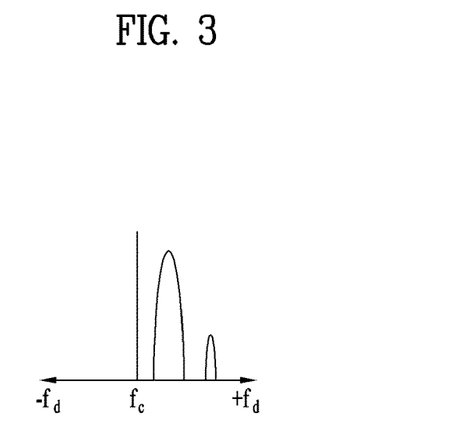
FIG. 3 is a diagram illustrating a Doppler spectrum when narrow beamforming is performed.

FIG. 2 is a diagram illustrating narrow beamforming related to the present invention, and FIG. 3 is a diagram illustrating a Doppler spectrum when narrow beamforming is performed.

In the ultrahigh frequency wireless communication system, since the center frequency is located at a very high band, a size of an antenna is small and an antenna array comprised of a plurality of antennas may be installed in a small space. This characteristic enables pin-point beamforming, pencil beamforming, narrow beamforming, or sharp beamforming, which is based on several tens of antennas to several hundreds of antennas. This narrow beamforming means that a received signal is received at a certain angle only not a constant direction.

FIG. 2(a) illustrates that a Doppler spectrum is represented in the form of U-shape depending on a signal received in a constant direction, and FIG. 2(b) illustrates that narrow beamforming based on a plurality of antennas is performed.

As described above, if narrow beamforming is performed, the Doppler spectrum is represented to be narrower than U-shape due to reduced angular spread. As shown in FIG. 3, it is noted from the Doppler spectrum when narrow beamforming is performed that Doppler spread is generated at a certain band only.

The aforementioned wireless communication system using the ultrahigh frequency band operates on a band having a center frequency ranging from several GHz to several tens of GHz. The characteristics of such a center frequency further worsen Doppler Effect generated from migration of a user equipment or influence of CFO due to an oscillator difference between a transmitter and a receiver.

Figure 4:
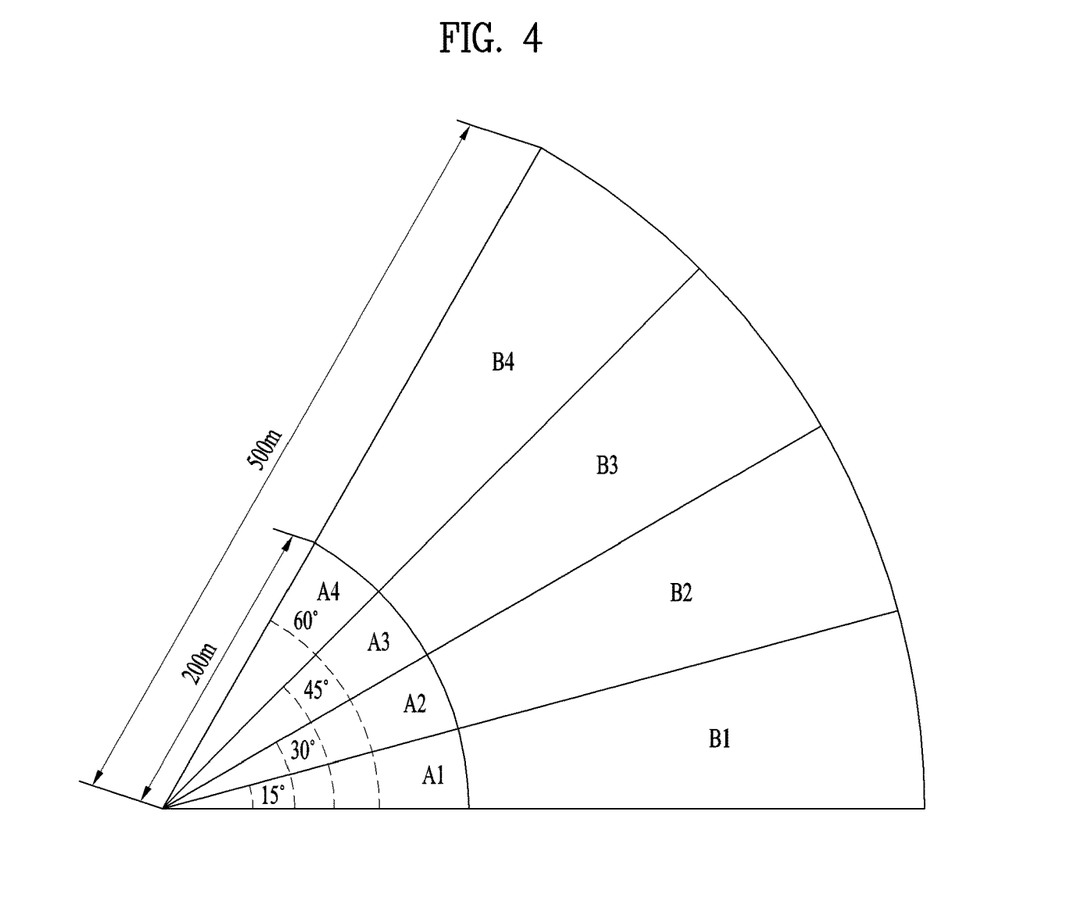
FIG. 4 is a diagram showing an example of a synchronization signal service area of a base station.

FIG. 4 is a diagram showing an example of a synchronization signal service area of a base station.

A user equipment (hereinafter abbreviated UE) performs synchronization with a base station using a downlink (DL) synchronization signal transmitted by the base station. In such a synchronization process, timing and frequency are synchronized between the base station and the UE. In order to enable UEs in a specific cell to receive and use a synchronization signal in a synchronization process, the base station transmits the synchronization signal by configuring a beam width as wide as possible.

Meanwhile, in case of an mmWave communication system that uses a high frequency band, a path loss in synchronization signal transmission appears greater than that of a case of using a low frequency band. Namely, a system using a high frequency band has a supportable cell radius reduced more than that of a related art cellular system (e.g., LTE/LTE-A) using a relatively low frequency band (e.g., 6 GHz or less).

As a method for solving the reduction of the cell radius, a synchronization signal transmitting method using a beamforming may be used. Although a cell radius increases in case of using a beamforming, a beam width is reduced disadvantageously. Equation 2 shows variation of a received signal SINR according to a beam width.

$$W \to M^{-2}W$$

$$SINR \to M^2 SINR \qquad \text{[Equation 2]}$$

If a beam width is reduced by $M^{-2}$ time according to a beamforming, Equation 2 indicates that a received SINR is improved by $M^2$ times.

Beside such a beamforming scheme, as another method for solving the cell radius reduction, it is able to consider a scheme of transmitting a same synchronization signal repeatedly. In case of such a scheme, although an addition resource allocation is necessary or a time axis, a cell radius can be advantageously increased without a decrease of a beam width.

Meanwhile, a base station allocates a resource to each UE by scheduling a frequency resource and a time resource located in a specific section. In the following, such a specific section shall be defined as a sector. In the sector shown in FIGS. 4, A1, A2, A3 and A4 indicate sectors having widths of 0~15', 15~30', 30~45' and 45~60' in radius of 0~200 m, respectively. B1, B2, B3 and B4 indicate sectors having widths of 0~15', 15~30', 30~45' and 45~60 ' in radius of 200~500 m, respectively. Based on the substance shown in FIG. 4, sector 1 is defined as {A1, A2, A3, A4} and sector 2 is defined as {A1, A2, A3, A4, B1, B2, B3, B4}. Moreover, if a current synchronization signal service area of a base station is the sector 1, in order for the base station to service a synchronization signal for the sector 2, assume that an additional power over 6 dB is required for a transmission of a synchronization signal.

First of all, in order to service the sector 2, the base station can obtain an additional gain of 6 dB using a beamforming scheme. Through such a beamforming process, a service radius can be extended from A1 to B1. Yet, since a beam width is reduced through the beamforming, A2 to A3 cannot be serviced simultaneously. Hence, when a beamforming is performed, a synchronization signal should be sent to each of the A2~B2, A3~B3, and A4~B4 sectors separately. So to speak, in order to service the sector 2, the base station should transmit the synchronization signal by performing the beamforming four times.

On the other hand, considering the aforementioned repetitive transmission of the synchronization signal, the base station may be able to transmit the synchronization signal to the whole sector 2. Yet, the synchronization signal should transmit the synchronization signal on a time axis repeatedly four times. Consequently, a resource necessary to service the sector 2 is identical for both a beamforming scheme and a repetitive transmission scheme.

Yet, since a beam width is narrow in case of ta beamforming scheme, a UE moving fast or a UE located on a sector boundary has difficulty in receiving a synchronization signal stably. Instead, if an ID of a UE located beam is identifiable, a UE can advantageously grasp its location through a synchronization signal. On the contrary, since a beam width is wide in case of a repetitive transmission scheme, it is less probable that a UE misses a synchronization signal. Instead, the UE is unable to grasp its location.

Figure 5:
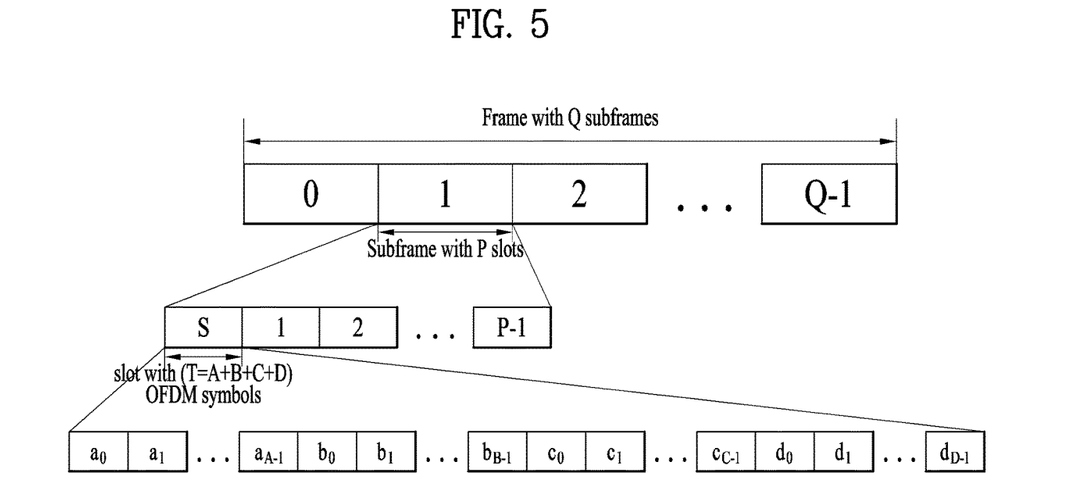
FIG. 5 shows an example of a frame structure proposed in a communication environment that uses mmWave.

FIG. 5 shows an example of a frame structure proposed in a communication environment that uses mmWave.

First of all, a single frame is configured with Q subframes, and a single subframe is configured with P slots. And, one slot is configured with T OFDM symbols. Here, unlike other subframes, a first subframe in a frame uses $0^{th}$ slot (slot denoted by 'S') for the usage of synchronization. And, the $0^{th}$ slot is configured with A OFDM symbols for timing and frequency synchronization, B OFDM symbols for beam scanning, and C OFDM symbols for informing a UE of system information. And, the remaining D OFDM symbols are used for data transmission to each UE.

Meanwhile, such a frame structure is a simple example only. Q, P, T, S, A, B, C and D are random values, and may include values set by a user or values set automatically on a system.

In the following, algorithm of timing synchronization between a base station and a UE is described. Let's consider a case that the base station transmits the same synchronization signal A times in FIG. 5. Based on the synchronization signal transmitted by the base station, the UE performs timing synchronization using the algorithm of Equation 3.

$$\hat{n} = \underset{\tilde{n}}{\operatorname{argmax}} \frac{\left|\sum_{i=0}^{A-2} y_{\tilde{n},i}^H y_{\tilde{n},i+1}\right|}{\sum_{i=0}^{A-2} |y_{\tilde{n},i}^H y_{\tilde{n},i+1}|}$$ 
[Equation 3]

where $$y_{\tilde{n},i} \triangleq r[\tilde{n} + i(N + N_g): \tilde{n} + i(N + N_g) + N - 1]$$

In Equation 3, N, $N_g$ and i indicate a length of OFDM symbol, a length of CP (Cyclic Prefix) and an index of OFDM symbol, respectively. r means a vector of a received signal in a receiver. Here, the equation $y_{\tilde{n},i} \triangleq r[\tilde{n}+i(N+N_g): \tilde{n}+i(N+N_g)+N-1]$ is a vector defined with elements ranging from $(\tilde{n}+i(N+N_g))$lth element to $(\tilde{n}+i(N+N_g)+N-1)^{lth}$ element of the received signal vector r.

The algorithm of Equation 3 operates on the condition that 2 OFDM received signals adjacent to each other temporally are equal to each other. Since such an algorithm can use a sliding window scheme, it can be implemented with low complexity and has a property robust to a frequency offset.

Meanwhile, Equation 4 represents an algorithm of performing timing synchronization using correlation between a received signal and a signal transmitted by a base station.

$$\hat{n} = \underset{\tilde{n}}{\operatorname{argmax}} \frac{\left|\sum_{i=0}^{A-1} y_{\tilde{n},i}^H s\right|^2}{\sum_{i=0}^{A-1} |y_{\tilde{n},i}|^2 \sum_{i=0}^{A-1} |s|^2}$$ 
[Equation 4]

In Equation 4, s means a signal transmitted by a base station and is a signal vector pre-agreed between a UE and a base station. Although the way of Equation 4 may have performance better than that of Equation 3, since Equation 4 cannot be implemented by a sliding window scheme, it requires high complexity. And, the way of Equation 4 has a property vulnerable to a frequency offset.

In continuation with the description of the timing synchronization scheme, a beam scanning process is described as follows. First of all, a beam scanning means an operation of a transmitter and/or a receiver that looks for a direction of a beam that maximizes a received SINR of the receiver. For example, a base station determines a direction of a beam through a beam scanning before transmitting data to a UE.

Further description is made by taking FIG. 4 as one example. FIG. 4 shows that a sector serviced by a single base station is divided into 8 areas. Here, the base station transmits a beam to each of (A1+B1), (A2+B2), (A3+B3) and (A4+B4) areas, and a UE can identify the beams transmitted by the base station. On this condition, a beam scanning process can be embodied into 4 kinds of processes. First of all, the base station transmits beams to 4 areas in sequence [i]. The UE determines a beam decided as a most appropriate beam among the beams in aspect of a received SINR [ii]. The UE feds back information on the selected beam to the base station [iii]. The base station transmits data using a beam having the direction of the feedback [iv]. Through the above beam scanning process, the UE can receive DL data through a beam having an optimized received SINR.

Zadoff-Chu sequence is described in the following. Zadoff-Chu sequence is called Chu sequence or ZC sequence and defined as Equation 5.

$$x_r[n] = e^{\frac{j\pi r n(n+1)}{N}}$$ 
[Equation 5]

In Equation 5, N indicates a length of sequence, r indicates a root value, and $x_r[n]$ indicates an $n^{th}$ element of ZC sequence. The ZC sequence is characterized in that all elements are equal to each other in size [constant amplitude]. Moreover, a DFT result of ZC sequence is also identical for all elements.

In the following, ZC sequence and a cyclic shifted version of the ZC sequence have the following correlation such as Equation 6

$$(x_r^{(i)})^H x_r^{(j)} = \begin{cases} N & \text{for } i = j \\ 0 & \text{elsewhere} \end{cases}$$ 
[Equation 6]

In Equation 6, $X_r^{(i)}$ is a sequence resulting from cyclic-shifting $X_r$ by i, and indicates 0 except a case that auto-correlation of ZC sequence is i=j. The ZC sequence also has zero auto-correlation property and may be expressed as having CAZAC (Constant Amplitude Zero Auto Correlation) property.

Regarding the final property of the ZC sequence ZC, the correlation shown in Equation 7 is established between ZC sequences having a root value that is a coprime of a sequence length N.

$$x_{r_1}^H x_{r_2} = \begin{cases} N & \text{for } r_1 = r_2 \\ \frac{1}{\sqrt{N}} & \text{elsewhere} \end{cases}$$ 
[Equation 7]

In equation 7, $r_1$ or $r_2$ is a coprime of N. For example, if N=111, $2 \leq r_1, r_2 \leq 110$ always meets Equation 7. Unlike auto-correlation of Equation 6, the mutual correlation of ZC sequence does not become 0 completely.

In continuation with ZC sequence, Hadamard matrix is described. The Hadamard matrix is defined as Equation 8.

$$H_{2^k} = \begin{bmatrix} H_{2^{k-1}} & H_{2^{k-1}} \\ H_{2^{k-1}} & -H_{2^{k-1}} \end{bmatrix} = H_2 \otimes H_{2^{k-1}}$$ 
[Equation 8]

where $$H_1 = [1]$$

$$H_2 = \begin{bmatrix} 1 & 1 \\ 1 & -1 \end{bmatrix}$$

In Equation 8, $2^k$ indicates a size of matrix. Hadamard matrix is a unitary matrix that always meets $H_n H_n^T = nI_n$, irrespective of a size n. Moreover, in Hadamard matrix, all columns and all rows are orthogonal to each other. For example, if n=4, Hadamard matrix is defined as Equation 9.

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad \text{[Equation 9]}$$

From Equation 9, it can be observed that columns and rows are orthogonal to each other.

Figure 6:
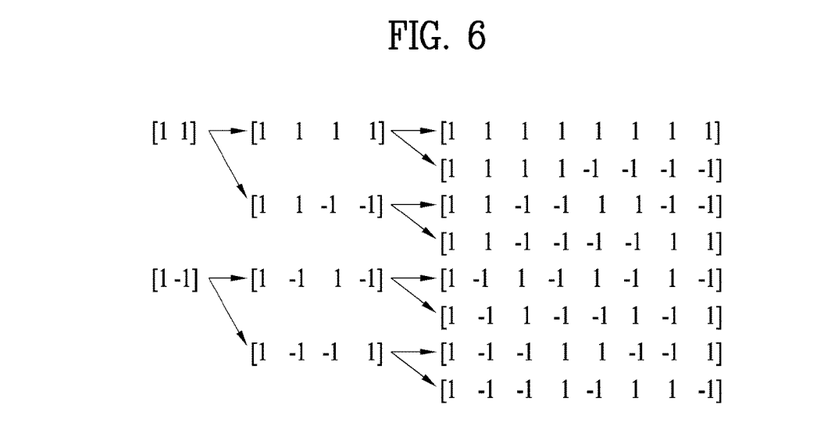
FIG. 6 shows a structure of OVSF (orthogonal variable spreading factor) code.

FIG. 6 shows a structure of OVSF (orthogonal variable spreading factor) code. The OVSF code is the code generated on the basis of Hadamard matrix and has specific rules.

First of all, in diverging to the right in the OVSF code [lower branch], a first code repeats a left mother code twice as it is and a second code is generated from repeating an upper code once, inverting it and then repeating the inverted code once. FIG. 6 shows a tree structure of OVSF code.

Such an OVSF code secures all orthogonality except the relation between adjacent mother and child codes on a code tree. For example, in FIG. 6, a code [1 -1 1 -1] is orthogonal to all of [1 1], [1 1 1 1], and [1 1 -1 -1]. Moreover, regarding the OVSF code, a length of code is equal to the number of available codes. Namely, it can be observed from FIG. 6 that a length of a specific ode is equal to the total number in a branch having the corresponding code belong thereto.

Figure 7:
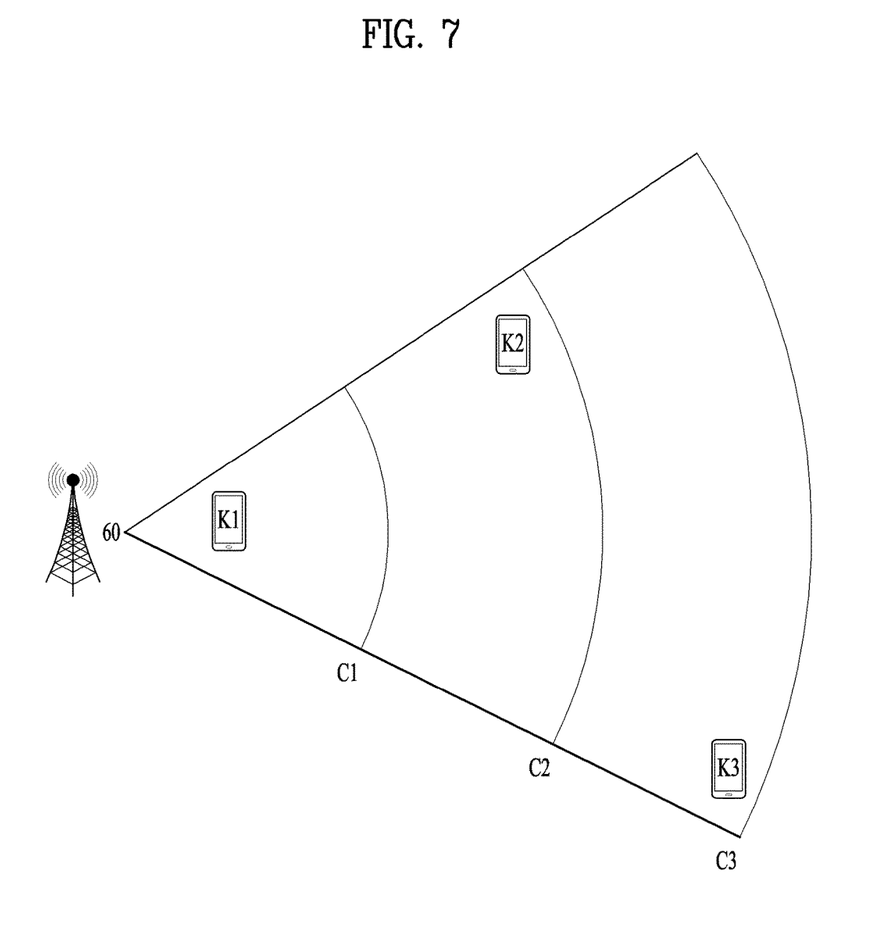
FIG. 7 is a diagram to describe a disposed situation of user equipments.

FIG. 7 is a diagram to describe a disposed situation of user equipments. RACH (Random Access CHannel) is described with reference to FIG. 7.

In case of LTE system, when RACH signals transmitted by UEs arrive at a base station, powers of the RACH signals of UEs received by the base station should be equal to each other. To this end, the base station defines a parameter 'preambleInitialReceivedTargetPower', thereby broadcasting the parameter to all UEs within a corresponding cell through SIB (System Information Block) 2. The UE calculates a pathloss using a reference signal, and then determines a transmit power of the RACH signal using the calculated pathloss and the parameter 'preambleInitialReceivedTargetPower' like Equation 10.

P_PRACH_Initial=min {P_CMAX, preambleInitial-ReceivedTargetPower+PL}   [Equation 10]

In Equation 10, P_PRACH_Initial, P_CMAX, and PL indicate a transmit power of RACH signal, a maximum transmit power of UE, and a pathloss, respectively.

Equation 10 is taken as one example for the following description. A maximum transmittable power of UE is assumed as 23 dBm, and a RACH reception power of a base station is assumed as -104 dBm. And, a UE disposed situation is assumed as FIG. 7.

First of all, a UE calculates a pathloss using a received synchronization signal and a beam scanning signal and then determines a transmit power based on the calculation. Table 3 shows a pathloss of UE and a corresponding transmit power.

signal should be transmitted with very small power (-44 dBm). Meanwhile, in case of a UE K2, although a pathloss is big, a necessary transmit power is 6 dBm. Yet, in case of a UE K3, since a pathloss is very big, a necessary transmit power exceeds P_CMA=23 dBm. In this case, the UE should perform a transmission with 23 dBm that is a maximum transmit power and a rate of UE's RACH access success is degraded by 3 dB.

Figure 8:
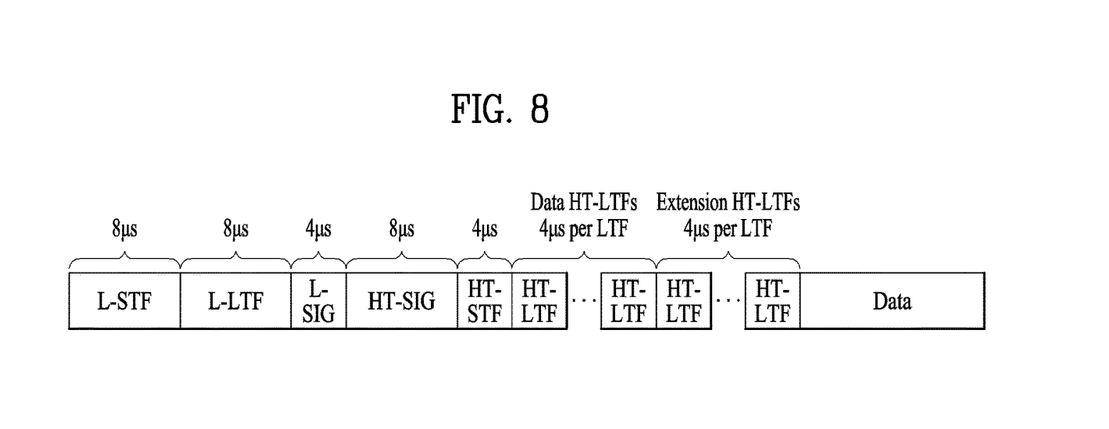
FIG. 8 shows a frame structure in HT (high throughput) system.
Figure 9:
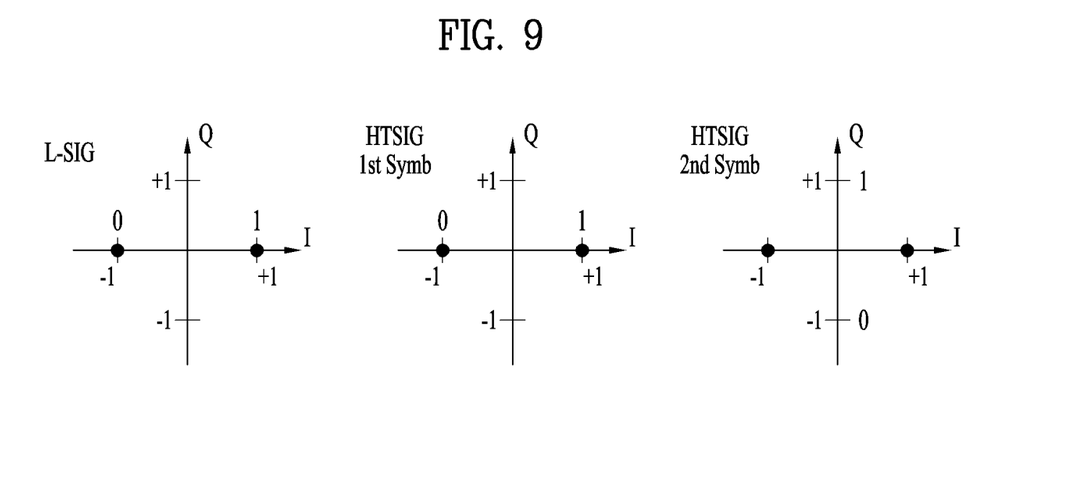
FIG. 9 shows constellation of data symbol mapping in HT system.

FIG. 8 shows a frame structure in HT (high throughput) system. FIG. 9 shows constellation of data symbol mapping in HT system.

FIG. 8 shows a frame structure of HT system on a time axis. L-SIG and HT-SIG indicate Legacy-Signal Field and High Throughput-Signal Field, respectively. If 1 OFDM symbol length is defined as 4 us, L-SIG corresponds to 1 OFDM but HT-SIG corresponds to 2 OFDM symbols.

In 802.11n system that is HT system, system information is transmitted to a UE using a frame of such a structure and such information is transmitted by being mapped to the constellation shown in FIG. 9. It can be observed from FIG. 9 that a first symbol of each of L-SIG and HT-SIG is mapped to BPSK (Binary Phase Shift Keying) and that a second symbol of HT-SIG is mapped to QBPSK (Quadrature BPSK).

Figure 10:
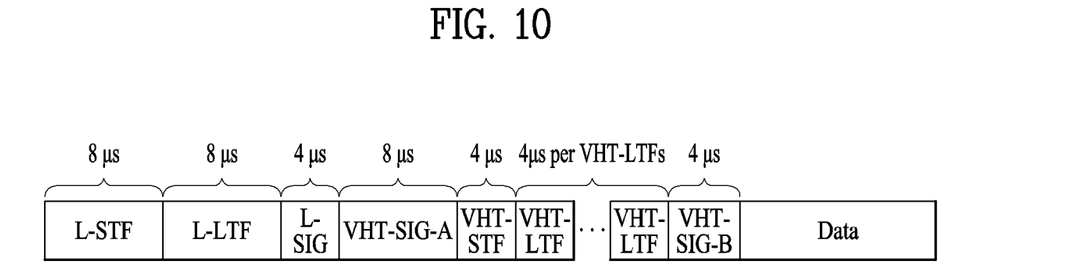
FIG. 10 shows a frame structure in VHT (very high throughput) system.
Figure 11:
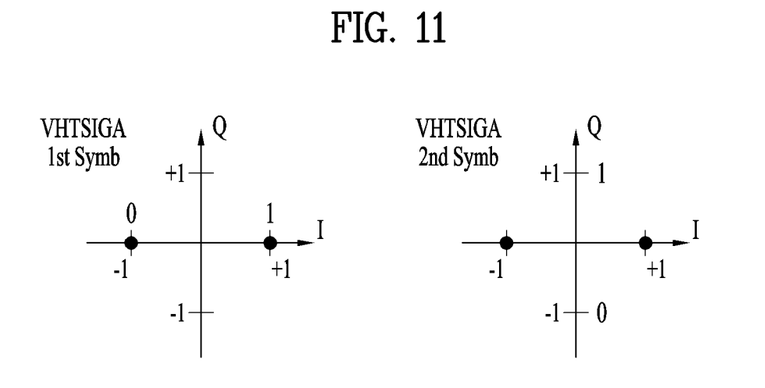
FIG. 11 shows constellation in VHT system.

FIG. 10 shows a frame structure in VHT (very high throughput) system. FIG. 11 shows constellation in VHT system.

In FIG. 10 and FIG. 11, like FIG. 8 and FIG. 9, system information is transmitted to a UE using L-SIG and VHT-SIG-A (Very high Throughput-Signal-A). and, VHT-SIG-A is transmitted by being mapped to the constellation shown in FIG. 11.

CFO and an estimation/compensation process of CFO are described as follows. CFO is generated by an oscillator frequency difference of a transmitter/receiver and/or Doppler effect. CFO can be divided into an integer part and a fraction part (e.g., when CFO=2.5, an integer is CFO=2 and a fraction is CFO=0.5). The integer CFO results in cyclic-shifting a subcarrier by a corresponding value, and the fraction CFO causes interference between subcarriers. Hence, in aspect of a receiver, a process for measuring and compensating such CFO is necessarily required.

In HT/VHT system, a CFO value is estimated using L-STF and L-LTF and the estimated CFP value is applied to a received OFDM symbol. Thus, influence of CFO is eliminated like Equation 11.

$$\begin{aligned} D(-\hat{\epsilon})y &= D(-\hat{\epsilon})(D(\epsilon)x + n) \quad \text{[Equation 11]} \\ &= D(\epsilon - \hat{\epsilon})x + n' \\ &= D(\Delta\epsilon)x + n' \end{aligned}$$

TABLE 3

| UE | preambleInitialReceivedTargetPower | Pathloss | Necessary transmit power | Transmit power | Additional necessary power |
|---|---|---|---|---|---|
| K1 | -104 dBm | 60 dB | -44 dBm | -44 dBm | 0 dBm |
| K2 | -104 dBm | 110 dB | 6 dBm | 6 dBm | 0 dBm |
| K3 | -104 dBm | 130 dB | 26 dBm | 23 dBm | 3 dBm |

In case of a UE K1 in table 3, a pathloss is very small. Yet, in order to match an RACH reception power, an RACH In Equation 11, $\epsilon$ indicate an original CFO value and $\hat{\epsilon}$ indicates a CFO value estimated from L-STF and L-LTF. 'y' means a received signal vector when CFO exists. 'x' means a received signal vector when CFO does not exist. 'n' means a noise vector. A diagonal matrix D(∈) is defined as Equation 12.

$$D(\epsilon) = \begin{bmatrix} 1 & 0 & & 0 \\ 0 & e^{j2\pi c/N} & \ddots & \\ & \ddots & \ddots & 0 \\ 0 & & 0 & e^{j2\pi c(N-1)/N} \end{bmatrix}$$  [Equation 12]

If a CFO value is perfectly estimated from L-STF and L-LTF ($\hat{\in}=\in$), CFO is completely eliminated from a received signal using Equation 11 (Δ∈=0). Yet, since a CFO value estimated from L-STF and L-LTF is not perfect ($\hat{\in} \neq \in$) and a CFO value slightly varies according to time, a residual CFO value is defined according to Equation 13.

Δ∈=∈−$\hat{\in}$+$\tilde{\in}$  [Equation 13]

In Equation 13, $\tilde{\in}$ means a CFO value changed according to time. In order to re-estimate a residual CFO, a receiver uses a pilot signal existing in L-SIG and HT-SIG. Meanwhile, if FFT operation is applied to D(−$\hat{\in}$)y in a state that a residual CFO fails to be completely eliminated (Δ∈≠0), a leakage signal is generated between subcarriers so as to lower a received SINR. Hence, CFO should be eliminated on a time axis using a CFO estimated value as accurate as possible so as to result in Δ∈≈0. Meanwhile, although distortion of a phase due to CFO can be corrected on a frequency axis, it is difficult to eliminate a leakage signal.

A process compensating CFO on a frequency axis is described as follows. First of all, CFO experienced by an nth OFDM symbol is defined as $\in_n$. A CFO estimated value, which is used to eliminate CFO on a time axis, in an $n^{th}$ or $(n+1)^{th}$ OFDM symbol is named $\hat{\in}_n$. Yet, since such an estimated value is not perfect ($\in_n \neq \hat{\in}_n$), there exists a residual CFO. Hence, a process for estimating a residual CFO using $n^{th}$ and $(n+1)^{th}$ OFDM symbols progresses, and an estimated residual CFO value is defined as Δ$\hat{\in}_n$.

Using the estimated residual CFO value, a receiver corrects a received signal ($r_k^l$) of a subcarrier according to Equation 14.

$\tilde{r}_k^l = r_k^l e^{-j2\pi \Delta \hat{\in}_n (N+N_g)/N}$, $l=n,n+1$  [Equation 14]

According to such a process, distortion of a phase due to a residual CFO can be compensated on a frequency axis. Meanwhile, unlike a process for eliminating CFO on a time axis, it is unable to remove influence of a leakage signal generated due to CFO. Hence, a CFO estimated value according to Equation 15 is used to eliminate CFO on a time axis by starting with $(n+2)^{th}$ and $(n+3)^{th}$ OFDM symbols.

$\hat{\in}_{n+2} = \hat{\in}_n + \Delta \hat{\in}_n$  [Equation 15]

Since $\hat{\in}_{n+2}$ is closer to $\in_{n+2}$ than $\hat{\in}_n$, a smaller residual CFO is induced. Hence, as a received signal on a frequency axis after FFT operation has smaller signal leakage, a received SINR is improved. Moreover, after estimating Δ$\hat{\in}_{n+2}$, a process for modifying a phase of a subcarrier received signal is performed.

2. Proposed Synchronization Signal Transceiving Method

Figure 12:
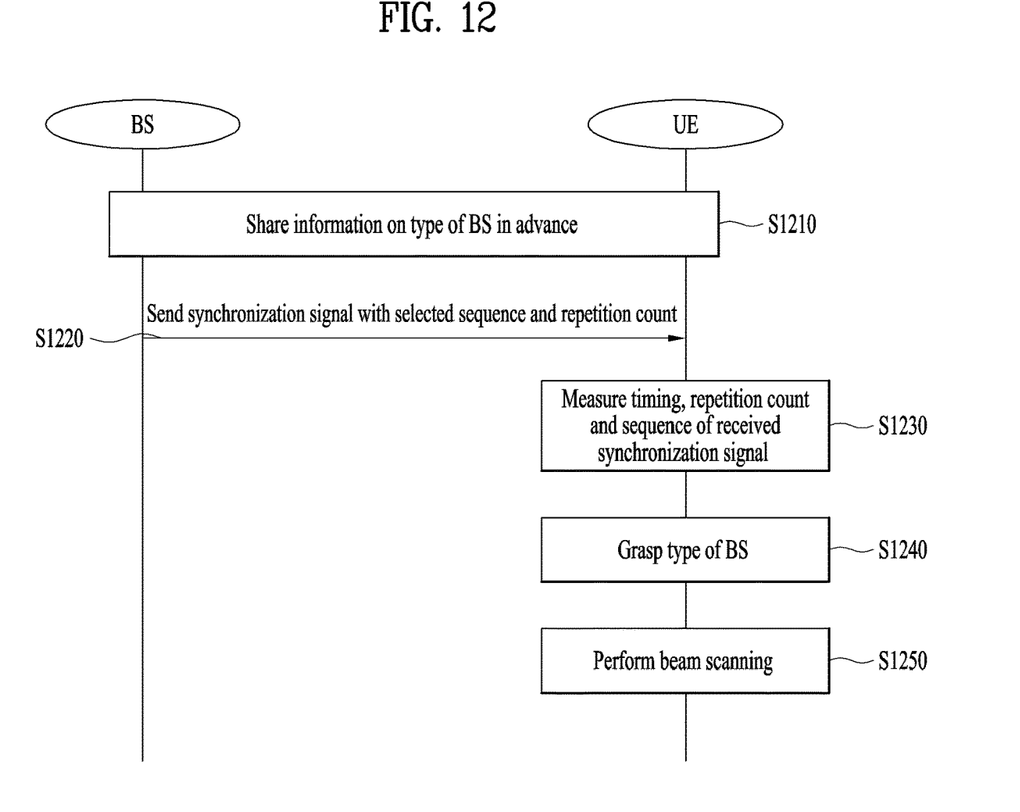
FIG. 12 is a flowchart for a synchronization signal transmitting/receiving method according to a proposed embodiment.

FIG. 12 is a flowchart for a synchronization signal transmitting/receiving method according to a proposed embodiment.

A cellular network of a related art assumes a macro cell in which a single base station services a wide area. Yet, a recent cellular network allows installation of a plurality of base stations having small transmission output within a macro cell. Such base stations with small outputs configure a small cell that services a narrow area.

Consequently, HetNet (heterogeneous network) is configured in a manner that a plurality of small cells exist within a single macro cell, which may considerably increase overall capacity of the network. Particularly, in case that a base station can actively support various ranges of service areas, capacity of such a network can be efficiently raised according to a network situation.

Meanwhile, a service area of a base station is determined by a delivery range of a synchronization signal. This is because a synchronization signal is transmitted in beam width as wide as possible so as to be received by a multitude of unspecific UEs. On the other hand, since a data signal is transmitted UE-specifically, it can be transmitted in narrow beam width. Consequently, in case of assuming the same transmit power, a synchronization signal having a wide beam width has a transmission distance shorter than that of a data signal having a narrow beam width. In the following, a service area means an area defined with a transmission distance of a synchronization signal.

A service area of a base station may be determined using a transmit power of the base station, a beam width, and a synchronization signal transmission repetition count. For example, if a repetition count is raised while maintaining a transmit power and a beam width, a service area is increased.

Based on the above substance, a method of transmitting a synchronization signal to enable a base station to efficiently adjust a service area and a method for a UE to receive the synchronization signal correspondingly are described as follows.

First of all, a type (or sort) of a base station is described. Base stations can be categorized into a plurality of types by a cell property, a pattern of a synchronization signal, and a pattern of a beam scanning signal. The cell property means a property defined by at least one of a transmission output of a base station, a cell radius, the number of subsectors, each of which is an area serviced by a single synchronization signal, and a sequence index of a synchronization signal. A pattern of a synchronization signal is a property defined as at least one of a beam width of a synchronization signal and a transmission repetition count of a synchronization signal. A pattern of a beam scanning signal is a property defined by at least one of a beam width of a beam scanning signal, the number of beam scanning signals and the number of OFDM symbols for a beam scanning signal.

Table 4 in the following shows a type of a base station defined by the cell property, the pattern of the synchronization signal and the pattern of the beam scanning signal.

TABLE 4

| BS type | Transmit power (dBm) | Cell radius (m) | # of sub-sectors | Beam width of synchro-nization signal | Repetition count of synchro-nization signal | Beam width of scanning signal | Repetition count of beam scanning signal | # of OFDM Symbols of beam scanning signal | Sequence number band |
|---|---|---|---|---|---|---|---|---|---|
| Macro A | 40 | 500 | 1 | 60' | 4 | 15' | 4 | 4 | 0~127 |
| Macro B | 40 | 500 | 2 | 30' | 2 | 15' | 2 | 2 | 0~127 |
| Macro C | 40 | 500 | 4 | 15' | 1 | — | — | — | 0~127 |
| Micro A | 27 | 200 | 1 | 60' | 4 | 15' | 4 | 4 | 128~255 |
| Micro B | 27 | 200 | 2 | 30' | 2 | 15' | 2 | 2 | 128~255 |
| Micro C | 27 | 200 | 4 | 15' | 1 | — | — | — | 128~255 |

In FIG. 4, sector 1 is defined as {A1, A2, A3, A4} and sector 2 is defined as {A1, A2, A3, A4, B1, B2, B3, B4}. Here, the following description is made by taking a base station of macro B type as one example. Since a transmit power is 500 m, the base station supports the sector 2. Since the sector 2 has a synchronization signal beam width of the base station is 30', it is divided into two subsectors {A1, A2, B1, B2} and {A3, A4, B3, B4}. Namely, since a repetition count of a synchronization signal is 2, the base station transmits a synchronization signal twice each by alternating between the subsector 1 and the subsector 2. In doing so, a sequence of the used synchronization signal is selected from bands 0~127. Moreover, since a beam width of a beam scanning signal is 15' and a repetition count is 2, the base station transmits a beam scanning signal to a UE by changing a direction for each subsector.

Namely, a base station transmits a synchronization signal and a beam scanning signal according to a parameter determined beforehand in response to a base station type. Meanwhile, a UE is already aware of information on the base station type and the corresponding parameter. Hence, if the base statin generates a synchronization signal using a specific sequence and then transmits the synchronization signal according to a prescribed repetition count, the UE can infer information on a type of the base station.

In particular, the UE obtains information on a timing, a repetition count and a sequence from a synchronization signal received from the base station. And, the UE can grasp a type of the base station from the measured repetition count and the information on the sequence of the synchronization signal.

For example, let's consider a case that a UE located in a subsector 1 in Table 4 receives a synchronization signal generated by a sequence #122 twice repeatedly. The UE estimates a timing, a repetition count and a sequence of a synchronization signal according to Equation 16.

$$\{\hat{n}, \hat{M}, \hat{k}\} = \underset{\tilde{n},\tilde{M},\tilde{k}}{\operatorname{argmax}} \frac{\left|\sum_{i=0}^{\tilde{M}-1} y_{\tilde{n},i}^H s_{\tilde{k}}\right|}{\sum_{i=0}^{\tilde{M}-1} |y_{\tilde{n},i}^H s_{\tilde{k}}|}$$

[Equation 16]

Equation 16 is an equation created from adding factors for a repetition count and sequence of a synchronization signal to Equation 4 indicating a timing of the synchronization signal. In Equation 16, M indicates a repetition count of synchronization signal and k indicates a sequence index of the synchronization signal. Equation 16 shows a maximum result value when a repetition count and a sequence index are matched as well as a timing of a synchronization signal. Hence, the UE can obtain information on a repetition count and sequence band of a received synchronization signal, and then grasps a type of a base station having transmitted the synchronization signal by comparing the obtained information with information on a previously stored base station type. So to speak, if the UE is aware that a repetition count of a synchronization signal is M and that k is 122, the UE determines that the base station is the base station of Macro B type from Table 4. Meanwhile, in Equation 16, $\tilde{n},\tilde{M},\tilde{k}$ are trial values used in calculating Equation 16, $\hat{n}, \hat{M}, \hat{k}$ indicate a reception timing of a synchronization signal, a repetition count of the synchronization signal, and a band having a sequence number of $\hat{k}$ synchronization signal belong thereto, respectively, for maximizing the calculation result of Equation 16, $y_{\tilde{n},i}$ indicates a received synchronization signal, and $s_{\tilde{k}}$ indicates a signal transmitted by the base station.

Based on the information on the grasped base station type, the UE performs a beam scanning process. Since the UE is aware of the base station type, it is able to grasp a beam width of a beam scanning signal, a repetition count of the beam scanning signal, and the number of OFDM symbols of the beam scanning signal. Hence, the UE receives beams transmitted from the base station and selects a beam determined as most appropriate from the received beams. Then, the UE feeds back information on the selected beam to the base station, thereby enabling the base station to transmit data on the beam optimized for the UE.

If a pattern of a beam scanning signal according to a type of a base station is not known to a UE in advance, the base station and the UE should use a pre-agreed beam scanning signal pattern only or the UE should estimate a pattern by a blind scheme. In the scheme of using a pre-agreed pattern, there is a problem that the base station is unable to enforce various beam scanning policies. In the blind scheme, high implementation complexity is required for the UE. On the other hand, according to the proposed scheme, since a UE is simply aware of a type of a base station, the UE can be aware of beam scanning related parameters of the base station in advance. Hence, complexity and efficiency of a beam scanning procedure are raised.

Meanwhile, a UE moving fast prefers a base statin having a wide service area of a synchronization signal. If the fast moving UE selects a base station having a narrow service area of a synchronization signal, handover may occur frequently. Hence, the UE checks a type of a base station based on an estimated repetition count of a synchronization signal and a sequence of the synchronization signal, thereby grasping an area serviced by the corresponding base station instantly. Hence, the fast moving UE can select a macro base station, which has a high repetition count and a wide service area, as a base station to be connected by the UE itself.

Meanwhile, FIG. 12 shows the aforementioned embodiments according to a time-series flow. Hence, it is apparent that the aforementioned contents are applicable to FIG. 12 identically or similarly despite failing to be illustrated in or described with reference to FIG. 12 in detail.

First of all, a base station is categorized into one of a plurality of types based on at least one of a cell property, a synchronization signal pattern, and a beam scanning signal pattern, and information on a type of the base station and parameters according to the base station type is shared beforehand between the base station and a UE [S1210]. The base station broadcasts a synchronization signal to a multitude of unspecific UEs located in a service area of the base station [S1220]. In doing so, the synchronization signal is broadcasted using a repetition count and sequence previously determined according to the type of the base station.

Having received the synchronization signal, the UE measures a reception timing, a repetition count and a sequence respectively [S1230]. Subsequently, by comparing parameters of the received synchronization signal with information on the base station type retained in the step S1210, the UE grasps that the base station corresponds to which type [S1240]. Having obtained the information on the type of the base station, the UE performs a beam scanning process using beam scanning related parameters (beam width of a beam scanning signal, a repetition count, the number of OFDM symbols) of the base station [S1250].

3. Apparatus Configuration

Figure 13:
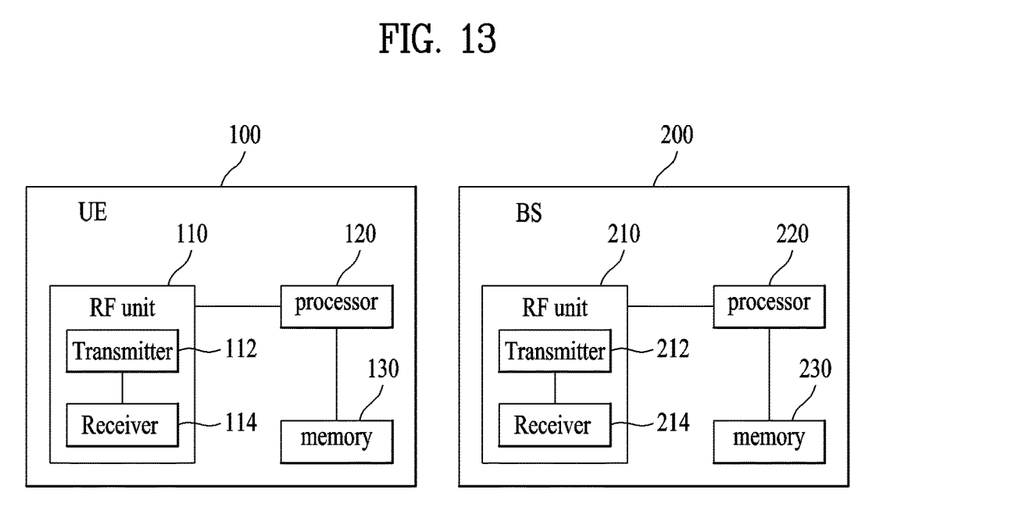
FIG. 13 is a diagram showing a configuration of a user equipment and a base station related to a proposed embodiment.

FIG. 13 is a block diagram showing the configuration of a user equipment (UE) and a base station (e.g., eNB) according to one embodiment of the present invention. In FIG. 13, the UE 100 and the base station 200 may include radio frequency (RF) units 110 and 210, processors 120 and 220 and memories 130 and 230, respectively. Although a 1:1 communication environment between the UE 100 and the base station 200 is shown in FIG. 13, a communication environment may be established between a plurality of UE and the base station. In addition, the base station 200 shown in FIG. 13 is applicable to a macro cell base station and a small cell base station.

The RF units 110 and 210 may include transmitters 112 and 212 and receivers 114 and 214, respectively. The transmitter 112 and the receiver 114 of the UE 100 are configured to transmit and receive signals to and from the base station 200 and other reception modules and the processor 120 is functionally connected to the transmitter 112 and the receiver 114 to control a process of, at the transmitter 112 and the receiver 114, transmitting and receiving signals to and from other apparatuses. The processor 120 processes a signal to be transmitted, sends the processed signal to the transmitter 112 and processes a signal received by the receiver 114.

If necessary, the processor 120 may store information included in an exchanged message in the memory 130. By this structure, the UE 100 may perform the methods of the various embodiments of the present invention.

The transmitter 212 and the receiver 214 of the base station b 200 are configured to transmit and receive signals to and from another base stations and UEs and the processor 220 are functionally connected to the transmitter 212 and the receiver 214 to control a process of, at the transmitter 212 and the receiver 214, transmitting and receiving signals to and from other apparatuses. The processor 220 processes a signal to be transmitted, sends the processed signal to the transmitter 212 and processes a signal received by the receiver 214. If necessary, the processor 220 may store information included in an exchanged message in the memory 230. By this structure, the base station 200 may perform the methods of the various embodiments of the present invention.

The processors 120 and 220 of the UE 100 and the base station 200 instruct (for example, control, adjust, or manage) the operations of the UE 100 and the base station 200, respectively. The processors 120 and 220 may be connected to the memories 130 and 230 for storing program code and data, respectively. The memories 130 and 230 are respectively connected to the processors 120 and 220 so as to store operating systems, applications and general files.

The processors 120 and 220 of the present invention may be called controllers, microcontrollers, microprocessors, microcomputers, etc. The processors 120 and 220 may be implemented by hardware, firmware, software, or a combination thereof If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 120 and 220.

Meanwhile, the aforementioned method may be implemented as programs executable in computers and executed in general computers that operate the programs using computer readable media. In addition, data used in the aforementioned method may be recorded in computer readable recording media through various means. It should be understood that program storage devices that can be used to describe storage devices including computer code executable to perform various methods of the present invention do not include temporary objects such as carrier waves or signals. The computer readable media include storage media such as magnetic recording media (e.g. ROM, floppy disk and hard disk) and optical reading media (e.g. CD-ROM and DVD).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The aforementioned synchronization signal receiving method is applicable to various wireless communication systems including an IEEE 802.16x system and an IEEE 802.11x system as well as to a 3GPP LTE/LTE-A system. Moreover, a proposed method is applicable to an mmWave communication system that uses an ultra-high frequency band.

What is claimed is:

1. A method of receiving a synchronization signal by a user equipment in a wireless communication system, the method comprising:
obtaining information on a plurality of base station types resulting from sorting a plurality of base stations by a predetermined parameter;
receiving the synchronization signal from a base station of a cell in which the user equipment is located;

estimating a repetition count of the synchronization signal and a band to which a sequence number of the synchronization signal belongs;

selecting a type of the base station having transmitted the synchronization signal from the plurality of base station types using a result of the estimation; and performing a beam scanning process in consideration of the selected type of the base station, wherein the estimating is performed based on an equation as follows:

$$\{\hat{n}, \hat{M}, \hat{k}\} = \underset{\tilde{n},\tilde{M},\tilde{k}}{\mathrm{argmax}} \frac{\left|\sum_{i=0}^{\tilde{M}-1} y_{\tilde{n},i}^H s_{\tilde{k}}\right|}{\sum_{i=0}^{\tilde{M}-1} |y_{\tilde{n},i}^H s_{\tilde{k}}|}, \quad [\text{Equation}]$$

where $\hat{n}$ indicates a reception timing of the synchronization signal, $\hat{M}$ indicates the repetition count of the synchronization signal, $\hat{k}$ indicates the band to which the sequence number of the synchronization signal belongs, $y_{\tilde{n},i}$ indicates the received synchronization signal, $s_{\tilde{k}}$ indicates a signal transmitted by the base station, and $\tilde{n},\tilde{M},\tilde{k}$ indicate trial values used for a process for calculating the equation.

2. The method of claim 1, wherein the predetermined parameter comprises a cell property parameter, a synchronization signal parameter and a beam scanning signal synchronization signal.

3. The method of claim 2, wherein the cell property parameter comprises at least one of a transmit power of the base station, a cell radius and a number of subsectors.

4. The method of claim 2, wherein the synchronization signal parameter comprises at least one of a beam width of the synchronization signal, a repetitive transmission count of the synchronization signal, and a sequence band of the synchronization signal.

5. The method of claim 2, wherein the beam scanning signal parameter comprises at least one of a beam width of a beam scanning signal, a repetitive transmission count of the beam scanning signal and a number of OFDM (Orthogonal Frequency Division Multiplexing) symbols allocated to the beam scanning signal.

6. The method of claim 5, wherein the performing the beam scanning process is performed based on the beam scanning signal parameter corresponding to the selected type of the base station.

7. A user equipment for receiving a synchronization signal in a wireless communication system, the user equipment comprising:

a transmitter;
a receiver; and
a processor coupled to the transmitter and the receiver, wherein the processor:

obtains information on a plurality of base station types resulting from sorting a plurality of base stations by a predetermined parameter, controls the receiver to receive the synchronization signal from a base station of a cell in which the user equipment is located, estimates a repetition count of the synchronization signal and a band to which a sequence number of the synchronization signal belongs, selects a type of a base station having transmitted the synchronization signal from the plurality of the base station types using a result of the estimation, and performs a beam scanning process in consideration of the selected type of the base station, wherein the processor performs the beam scanning process based on an equation as follows:

$$\{\hat{n}, \hat{M}, \hat{k}\} = \underset{\tilde{n},\tilde{M},\tilde{k}}{\mathrm{argmax}} \frac{\left|\sum_{i=0}^{\tilde{M}-1} y_{\tilde{n},i}^H s_{\tilde{k}}\right|}{\sum_{i=0}^{\tilde{M}-1} |y_{\tilde{n},i}^H s_{\tilde{k}}|}, \quad [\text{Equation}]$$

where $\hat{n}$ indicates a reception timing of the synchronization signal, $\hat{M}$ indicates the repetition count of the synchronization signal, $\hat{k}$ indicates the band to which the sequence number of the synchronization signal belongs, $y_{\tilde{n},i}$ indicates the received synchronization signal, $s_{\tilde{k}}$ indicates a signal transmitted by the base station, and $\tilde{n},\tilde{M},\tilde{k}$ indicate trial values used for a process for calculating the equation.

8. The user equipment of claim 7, wherein the predetermined parameter comprises a cell property parameter, a synchronization signal parameter and a beam scanning signal synchronization signal.

9. The user equipment of claim 8, wherein the cell property parameter comprises at least one of a transmit power of the base station, a cell radius and a number of sub sectors.

10. The user equipment of claim 8, wherein the synchronization signal parameter comprises at least one of a beam width of the synchronization signal, a repetitive transmission count of the synchronization signal, and a sequence band of the synchronization signal.

11. The user equipment of claim 8, wherein the beam scanning signal parameter comprises at least one of a beam width of a beam scanning signal, a repetitive transmission count of the beam scanning signal and a number of OFDM (Orthogonal Frequency Division Multiplexing) symbols allocated to the beam scanning signal.

12. The user equipment of claim 11, wherein the processor performs the beam scanning process based on the beam scanning signal parameter corresponding to the selected type of the base station.

* * * * *